(No Model.) 6 Sheets—Sheet 1.

J. H. GUNDER.
AUTOMATIC GRAIN WEIGHING SCALE.

No. 474,825. Patented May 17, 1892.

WITNESSES.
F. W. Hamer
J. A. Walsh

INVENTOR.
James H. Gunder,
per C. & E. W. Bradford,
ATTORNEYS.

(No Model.) 6 Sheets—Sheet 2.

J. H. GUNDER.
AUTOMATIC GRAIN WEIGHING SCALE.

No. 474,825. Patented May 17, 1892.

(No Model.)  6 Sheets—Sheet 3.

J. H. GUNDER.
AUTOMATIC GRAIN WEIGHING SCALE.

No. 474,825.  Patented May 17, 1892.

WITNESSES.  INVENTOR.

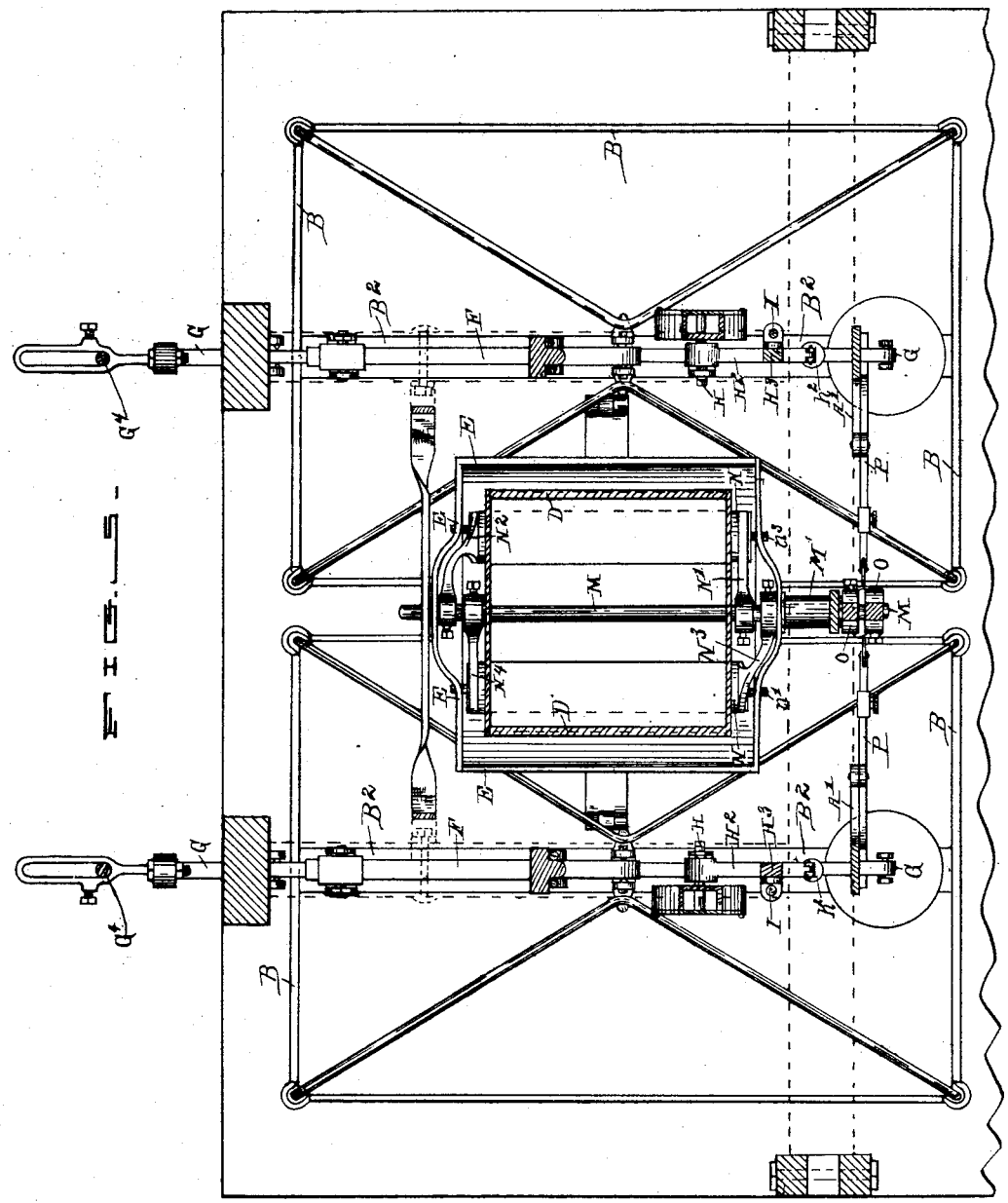

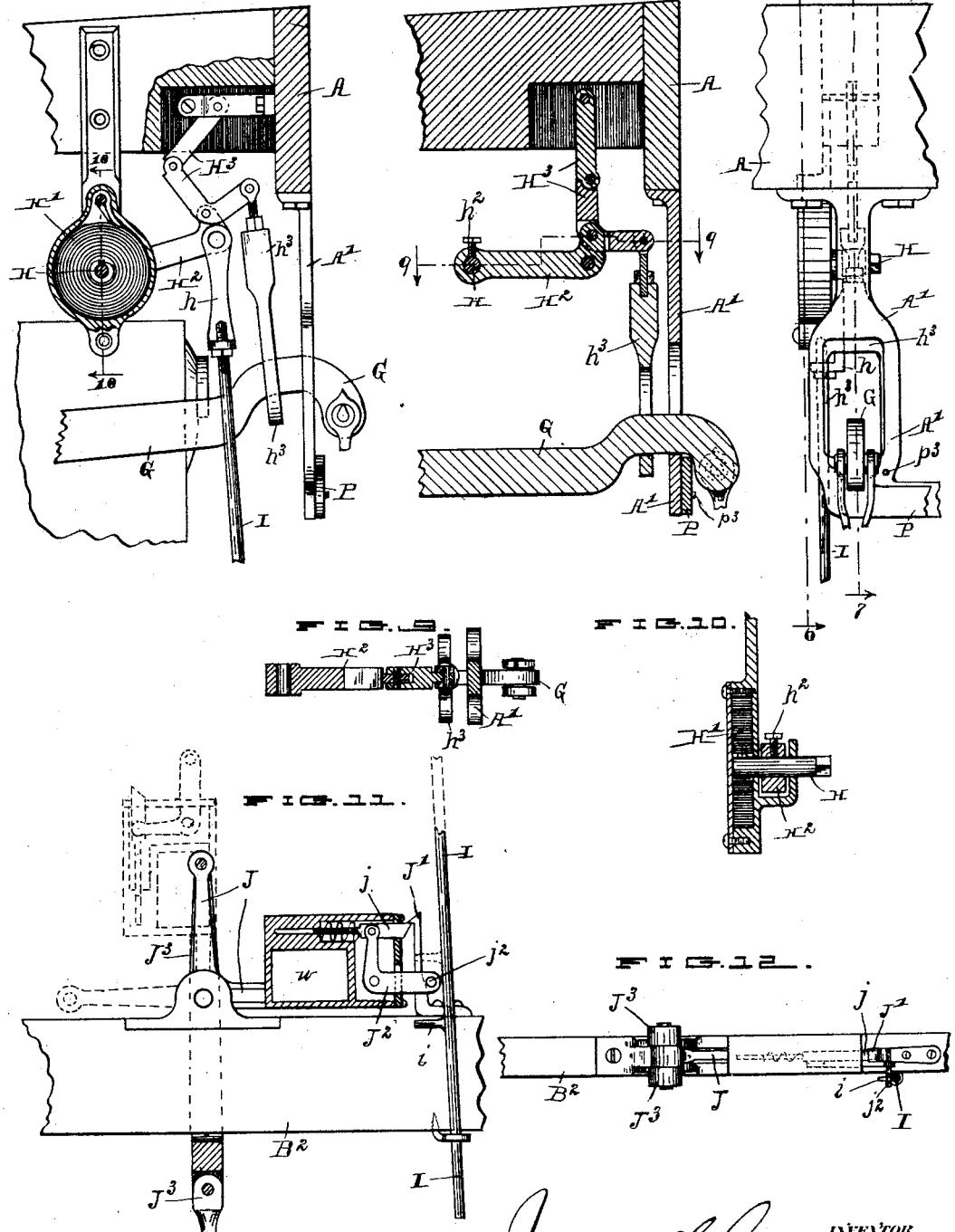

(No Model.) 6 Sheets—Sheet 6.
J. H. GUNDER.
AUTOMATIC GRAIN WEIGHING SCALE.
No. 474,825. Patented May 17, 1892.
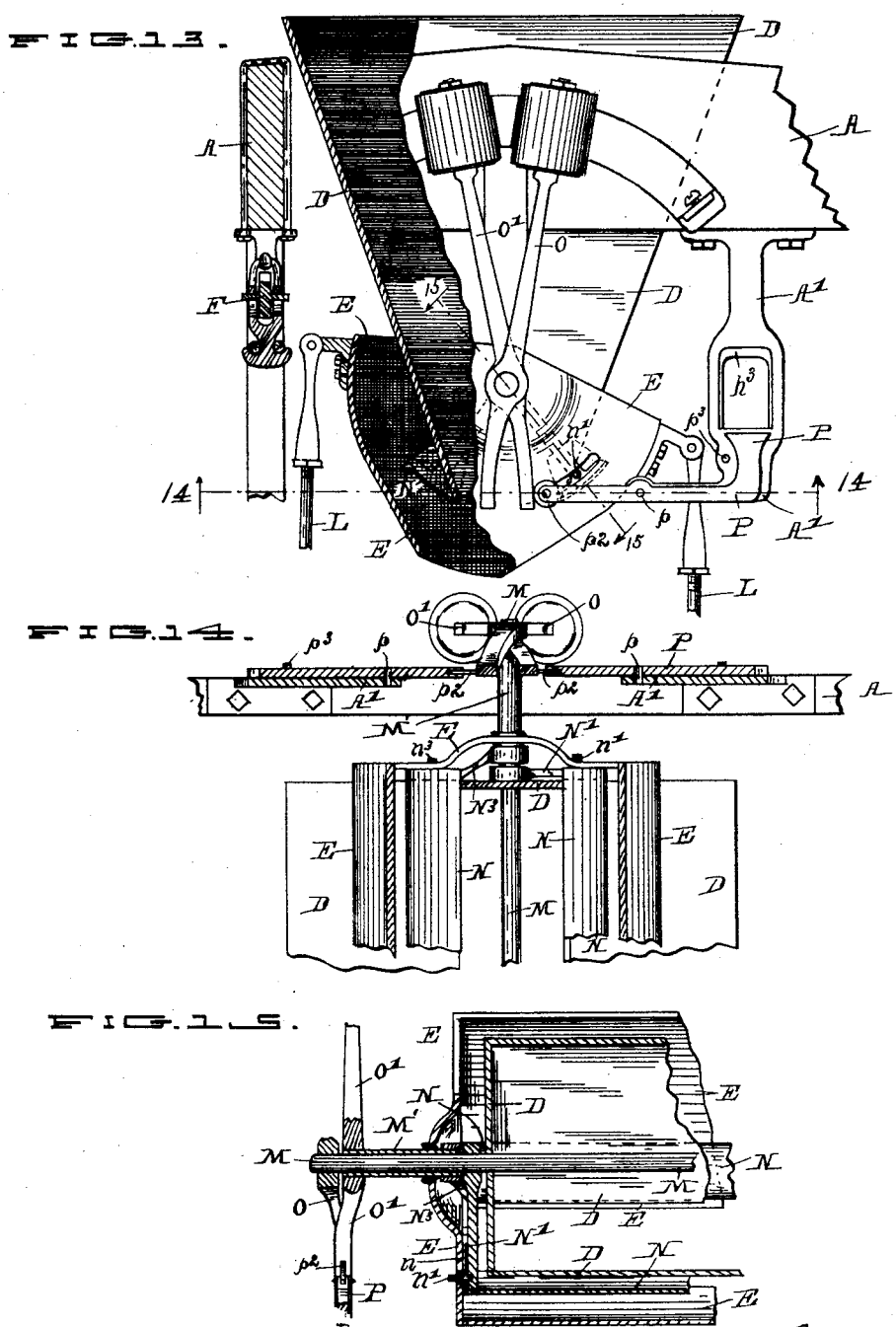

UNITED STATES PATENT OFFICE.

JAMES H. GUNDER, OF HOMER, ILLINOIS.

AUTOMATIC GRAIN-WEIGHING SCALE.

SPECIFICATION forming part of Letters Patent No. 474,825, dated May 17, 1892.

Application filed August 11, 1891. Serial No. 402,346. (No model.)

*To all whom it may concern:*

Be it known that I, JAMES H. GUNDER, a citizen of the United States, residing at Homer, in the county of Champaign and State of Illinois, have invented certain new and useful Improvements in Automatic Grain-Weighing Scales, of which the following is a specification.

My present invention consists in certain improvements upon that shown and described in Letters Patent No. 452,029, granted to myself and William H. Pierce, dated May 12, 1891, whereby the operation of said invention is still further perfected, as will be hereinafter more particularly described and claimed.

Figure 1:
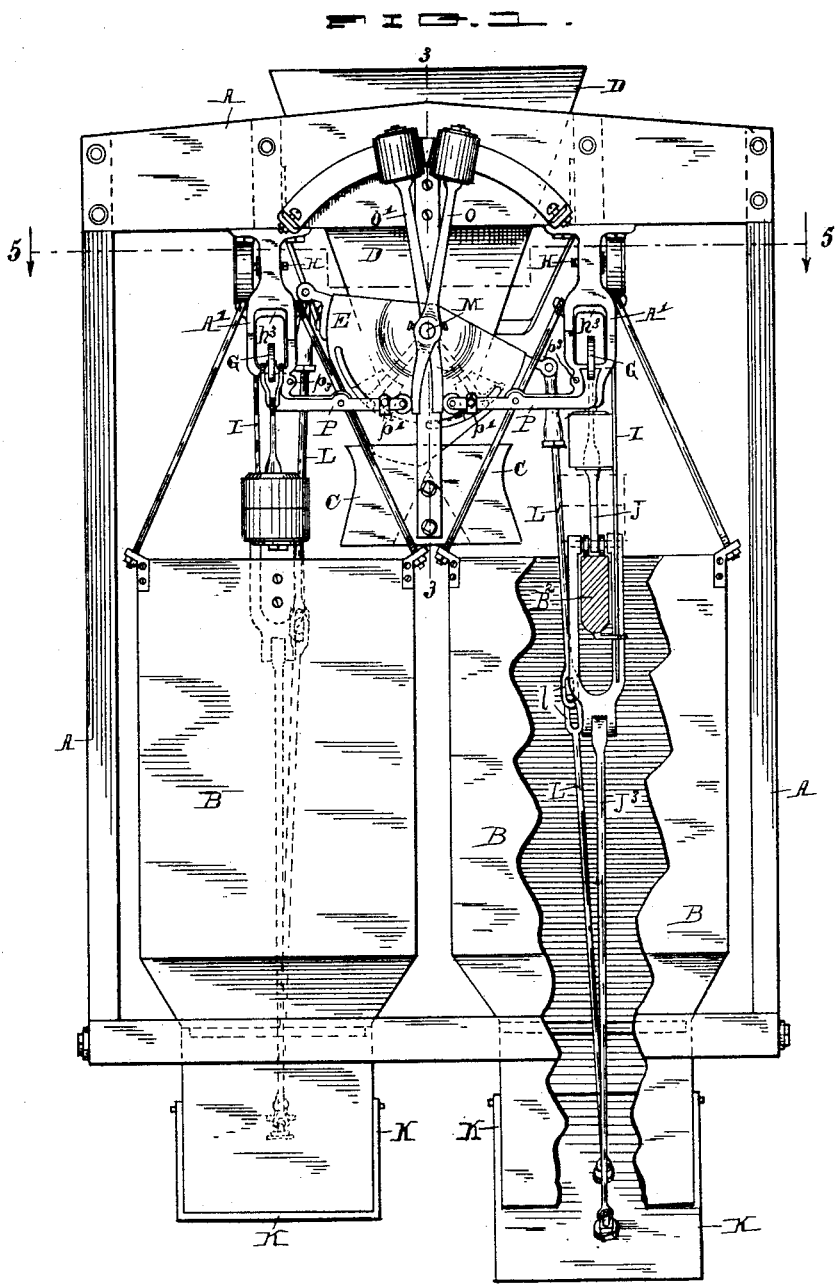
Figure 2:
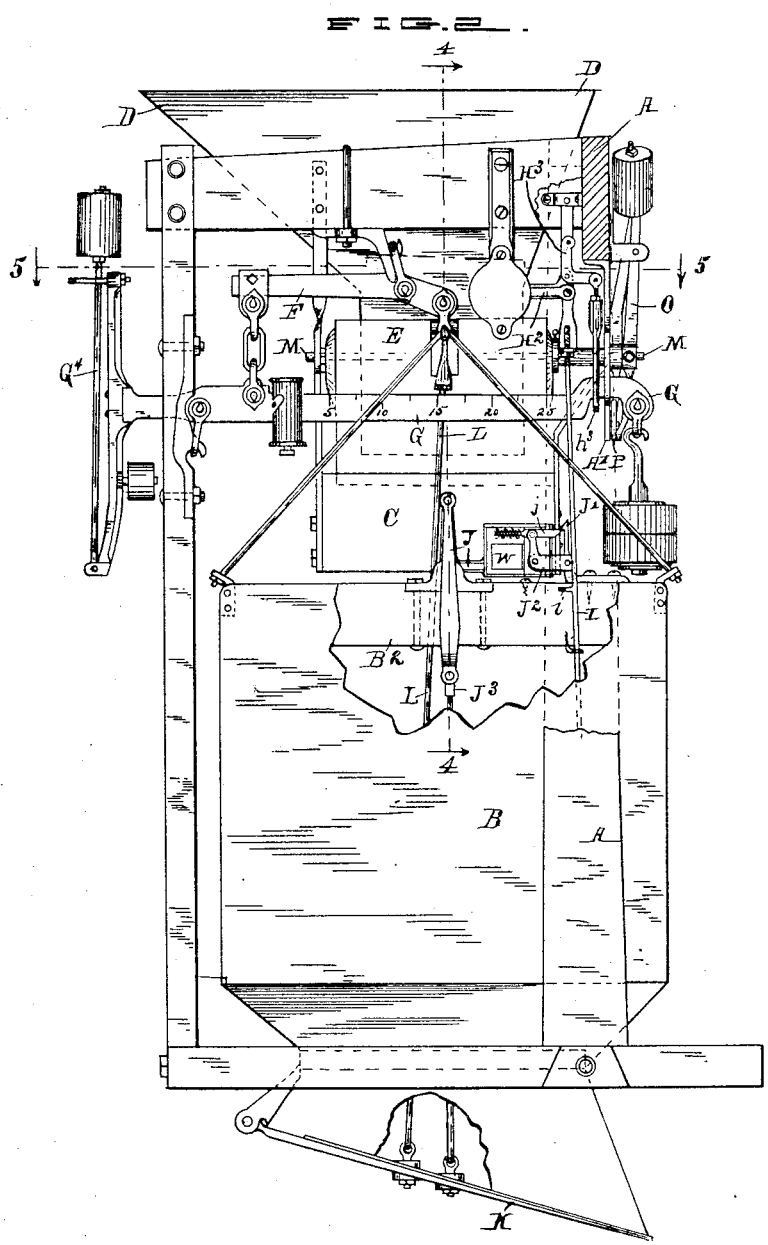
Figure 3:
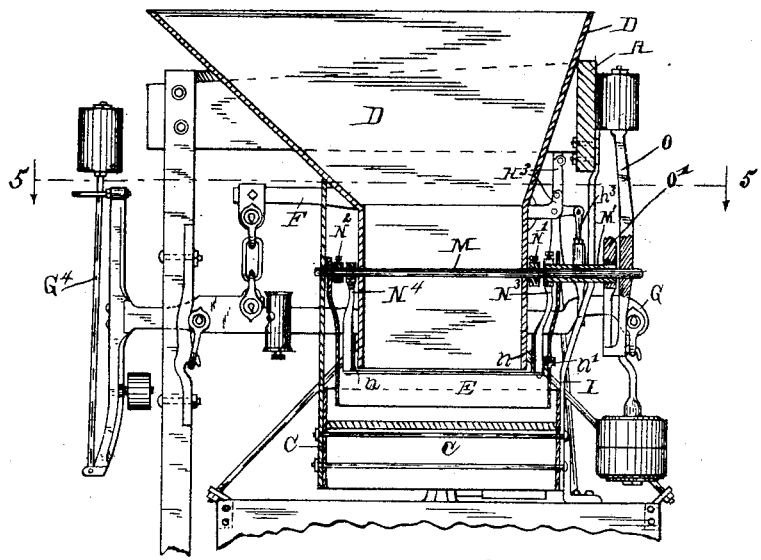
Figure 4:
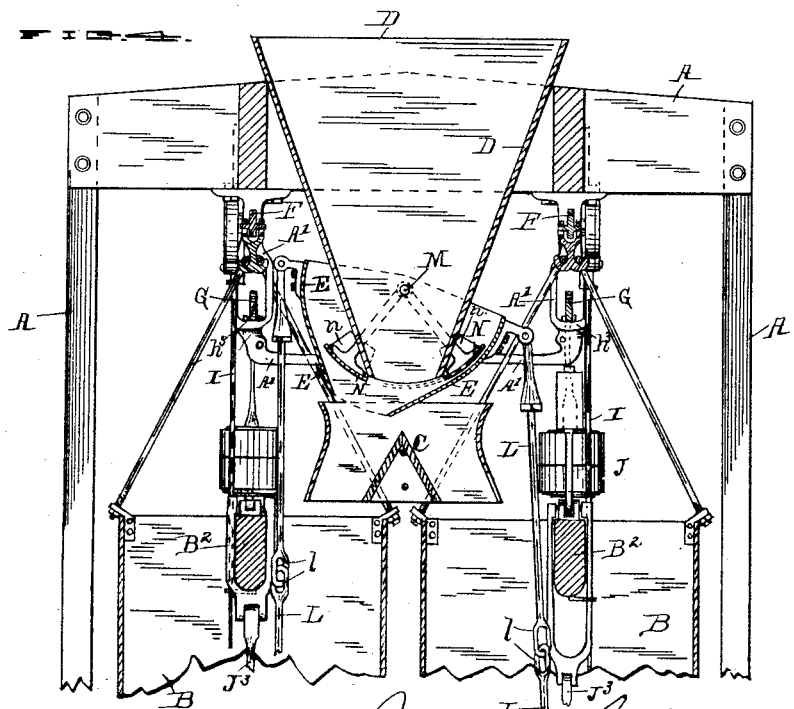

Referring to the accompanying drawings, which are made a part hereof and on which similar letters of reference indicate similar parts, Figure 1 is a front elevation of a scale embodying the improvements specified, with a portion of the front wall of one of the receptacles broken away to show interior parts; Fig. 2, a side elevation of same, portions of the side being broken away for a similar purpose; Fig. 3, a transverse vertical sectional view looking toward the right from the dotted line 3 3 in Fig. 1; Fig. 4, a similar view looking toward the right from the dotted line 4 4 in Fig. 2; Fig. 5, a horizontal sectional view looking downwardly from the dotted line 5 5 in Figs. 1, 2, and 3; Fig. 6, a detail view, on an enlarged scale, illustrating the trip-rod actuating mechanism in its operated position; Fig. 7, a sectional view of the same mechanism in its set position; Fig. 8, a front elevation of the same; Fig. 9, a horizontal sectional view looking downwardly from the dotted line 9 9 in Fig. 7; Fig. 10, a detail sectional view looking toward the left from the dotted line 10 10 in Fig. 6; Fig. 11, a detail elevation of the locking device which the trip-rod operates, one side being broken away to show the mechanism and its operated position being shown by means of dotted lines; Fig. 12, a plan view of the same; Fig. 13, a view, partly in elevation and partly in section, of the shifting chute and adjacent parts; Fig. 14, a horizontal sectional view looking upwardly from the dotted line 14 14 in Fig. 13, and Fig. 15 a sectional view looking in the direction indicated by the arrows from the dotted line 15 15 in Fig. 13.

In said drawings, the portions marked A represent the frame-work of my improved scale; B B, the two receptacles which contain grain while being weighed; C, a double chute located below the hopper, one of the two exits of which leads to each of the two grain-receptacles; D, a feed-hopper secured to the frame-work, into which the grain is first directed when it is to be weighed by my improved apparatus; E, a pivoted hopper-shaped shifting chute located intermediate the double chute C and the feed-hopper D and adapted to be discharged alternately into each of the two exits of said chute C; F F, the levers upon which the grain-receptacles B are suspended; G G, the scale-beams; H H, rock-shafts, upon which are mounted arms and springs, which through suitable connections set off the gate-opening mechanism; I I, trip-rods connected to arms on the rock-shafts H; J J, bell-crank levers mounted on cross-bars on the receptacles B; K K, the discharging-gates; L L, rods running from said discharging-gates to projections on the shifting chute E; M M', rock-shafts (one of which is hollow and sleeved upon the other) which carry the reducing-gates, whereby the flow of grain is reduced just previous to the shifting of the flow from one receptacle to the other; N N, said reducing-gates; O O', weighted levers secured upon the rock-shafts M M', which operate said reducing-gates, and P P weighted catches pivoted to the hangers at the forward ends of the scale-beams and which sustain the weighted levers, which, when released, operate the reducing-gates.

As stated, the present invention consists in modifications upon that shown in Patent No. 452,029. Many of the parts is also identical with those shown and described in said patent. The operation for the most part are identical. For these reasons I will not describe all of the parts in detail, but will describe mainly the features which are new, including description of the old parts only incidentally.

The rock-shafts H and the parts connected therewith embody material differences over the corresponding parts shown in said former patent. Instead of weights attached to said rock-shafts, coiled springs H' are connected therewith, as shown most plainly in Fig. 6. As shown in Fig. 10, provision is made for adjusting the tension of these springs by loosening the set-screw $h^2$, which fixes the position of the arm $H^2$ on the shaft H, and then turning the shaft H by means of a key or wrench until said spring H' has the required tension, and then again setting up the set-screw $h^2$. The arm $H^2$ extends out from the rock-shaft, and is connected by means of a link $h$ or otherwise with the rod I. It is also connected to a toggle $H^3$, which is pivoted at the upper end to the frame-work, as shown most plainly in Figs. 6 and 7. The lower member of this toggle has a link $h^3$ connected thereto, which extends down around the scale-beam G. The perforation in this link is of somewhat less size than the perforation in the hanger A' upon the frame-work, through which also the scale-beam passes. The operation is therefore that when the scale-beam has nearly reached the limit in its upward movement, it comes in contact with the upper side of the perforation in the link $h^3$ and operates, through the bell-crank formation of the lower end of the toggle, to bend the joint of said toggle, which has up to that time acted as a stay-rod, holding the arm $H^2$ down. As will be readily understood, immediately the toggle is started it loses its capacity to act as a stay or brace against the arm $H^2$, and the spring H' is therefore free to rock the shaft H, lifting the arm $H^2$ and pulling on the trip-rod I, which operates, as in the invention of said former patent, to start the holding mechanism for the discharging-gates, as will be presently more fully described. The scale-beam is aided in breaking the toggle by the force of the weighted lever $G^4$, which falls when the scale-beam ascends and accelerates the movement of said scale-beam and increases its force, as in said former patent. The bell-crank levers J occupy the same position and serve the same purpose as in said aforementioned Letters Patent; but they are provided with a new and improved locking and tripping mechanism. Within a barrel in an enlarged portion of each of said levers J is a spring-catch $j$, which is adapted to engage with a latch J', secured to the cross-bar $B^2$. Also within the enlarged end of said bell-crank lever is a smaller bell-crank lever $J^2$, pivoted thereto at the angle and pivoted to the spring-catch $j$ at one end, while the other end extends to the outside, where it is provided with a projecting pin $j^2$. With this projecting pin $j^2$ a projection $i$ on the trip-rod I is adapted to come in contact as said rod is raised by the force of the spring H', which rocks the bell-crank lever $J^2$ on its pivot and forces the spring-catch $j$ back out of engagement with the latch J'. It at the same time gives the main bell-crank lever J a slight impetus over its pivot, and the weight of the load of grain pulling on the rod $J^3$ completes the movement and permits the discharging-gate connected to said rod to open. The position of the shifting chute E is changed at the same time by means of the rod L, as in said aforementioned Letters Patent. The gates K are hinged to the lower ends of the receptacles B, as before, and are held to closed position by means of the rods $J^3$, connected to the bell-crank levers J. Said bell-crank levers, by means of being provided with weighted or heavy and large ends, as shown, are enabled to complete the closing of said gates as they reach their final position. The enlarged ends of these bell-crank levers, besides being provided with suitable openings to contain the spring-catches $j$ and the bell-crank levers $J^2$, have openings $w$, adapted to contain weight material, whereby the weight thereof may be adjusted to correspond to this work of completing the closing of the gates K. The gates K are opened by their own weight and the weight of the grain thereon, and are each closed for the most part by the weight of the grain in the other through the shifting chute E and rods L. Said rods are made in two parts and are united by link-shaped eyes $l$, as shown most plainly in Fig. 4. This is done so that when the gates are entirely closed and the operation of weighing is going on there shall be no tension on the rods, which, if permitted, would make the machine work stiffly and interfere with the accuracy of the weighing. By the construction shown they are rendered perfectly loose, the final fraction of the movement of the gates in closing being accomplished by the movement of the weighted bell-crank levers J, as above described, which leaves the gates free to fall slightly when they start to open before there is any tension on said rods L.

Instead of, as formerly, having two separate shafts near the two sides of the machine, I put a shaft M in the center, and over this put a sleeve or hollow shaft M', and these in my improved construction constitute the two shafts of the machine. At a point on both sides of the hopper D are placed arms which support the two reducing-gates N N, each gate having two arms, one at each side of the hopper. The two arms N' $N^2$, which support one of these gates, are secured fixedly upon the central shaft, while of the two arms $N^3 N^4$, which support the other gate, one is securely fixed upon the hollow shaft, while the other plays loosely upon the solid shaft. The gates therefore follow the movements of the two shafts. This is illustrated best in Fig. 3. Upon the inner surface of the arms, and extending up from the gates past the ends of the hopper, are thin plates $n$, which constitute guards to prevent the grain from working out under the ends of the hopper, which, if permitted, would interfere with the movements of the arms.

Upon the front ends of the two shafts M M' are fixedly mounted the two vibrating levers O O', upon the upper ends of which weights are secured as shown most plainly in Fig. 1. These levers project down somewhat below the shafts, (other projections might of course be substituted,) and their lower ends are arranged to come in contact with the pivoted weighted catches P P. As already stated, the weighted lever O and the arm N' to one of the reducing-gates are fixedly secured to the same shaft, and the weighted lever O' and the arm N³ to the other reducing-gate are fixedly secured to the other shaft of the pair of shafts M M'. This insures that the parts O and N' shall move together and the parts O' and N³ shall move together. Extending outwardly from the arms N' and N³ are pins $n'$ and $n^3$, which extend through slots cut in the end of the shifting chute E.

Referring now to Fig. 1, it will be noticed that the condition and arrangement of the parts indicates that the grain has been entirely discharged from the right-hand receptacle and the scale-beam returned to place, while the left-hand receptacle is in process of filling and has not yet reached the point where any of the mechanism has been operated. It will be observed that whenever said left-hand receptacle is nearly full the same weight $p'$ will serve to raise the scale-beam with which this weighted catch comes in contact, slightly permitting the escape of the weighted arm O therefrom. This will fall, carrying with it the reducing-gate which is below it, and the pin $n'$, extending out from said reducing-gate through the slot in the shifting chute, will reach the lower end of said slot. In a moment afterward, when the predetermined amount of grain has been fully reached in the grain-receptacle, the scale-beam will rise to its extreme upper position, setting off the mechanism which shifts the flow. The pin, being in contact with the lower end of the slot in the shifting chute, said shifting chute, as it shifts, will carry back with it the reducing-gate, which will not only open the lower end of the hopper to its full capacity, but will, by reason of being rigidly attached to the same shaft with the weighted lever O, raise said lever to its former position. It will pass over the anti-friction truck $p^2$ on the corresponding weighted catch P, and will be held in its proper position until the next succeeding movement, as will be readily understood. These weighted catches P P are pivoted to extensions of the hangers A', and one end of each is adapted to come directly below the corresponding scale-beam, while the other extends out and comes in contact with the lower projections of the levers O O', as shown in Fig. 1.

The operation is: Just before the grain-receptacle has become fully loaded, at the moment the scale-beam begins to ascend, the catch P is caused (by the weight $p'$ thereon) to descend out of contact with the corresponding weighted lever. This permits the said weighted lever to fall, operating the corresponding reducing-gate and partially shutting off the flow of grain. A moment later the scale-beam strikes the upper part of the opening in the link $h^3$, which by the means heretofore described results in opening the discharging-gate and discharging the load, which immediately shifts the shifting chute E to discharge into the other receptacle of the pair, when one of the pins $n'$ or $n^3$ on the reducing-gates lifts the weighted lever which has fallen, swinging it back to the position it formly occupied, when the weighted catch P is forced by the weight of the scale-beam back to its position, where it catches and holds it ready for the next operation. To facilitate their engagement with the weighted levers, the weighted catches P are armed on their ends which come in contact therewith with anti-friction trucks $p^2 p^2$. Stops $p^3 p^3$ limit the distance which the weighted catches may follow the scale-beams upwardly.

The whole operation of the machine may be briefly recapitulated as follows: All the parts being set ready for operation and the stream of grain being turned into the hopper, it continues to flow without moving any of the mechanism until the receptacle into which the grain runs has received substantially the predetermined amount. The scale-beam then begins to rise slightly, when the corresponding weighted catch P immediately falls, (at the same time aiding the upward movement of the scale-beam,) releasing the corresponding weighted lever O or O', which operates the corresponding reducing-gate, thus nearly shutting off the flow. The corresponding weighted lever G⁴ is thrown into operation by this slight movement, as described above and in the aforementioned Letters Patent. The scale-beam next strikes the link $h^3$, which breaks the toggle, allowing the spring H' to operate through the trip-rod to release the operating mechanism, whereupon the discharging-gate K falls, at the same time shifting the shifting chute and resetting the weighted lever O or O', in which position the parts remain until the other receptacle is substantially filled, when the same operation is repeated, and so on continuously so long as grain is permitted to flow into the machine.

Having thus fully described my said invention, what I claim as new, and desire to secure by Letters Patent, is—

1. The combination, in an automatic grain-weighing scale, of the grain-receptacles, discharging-gates thereto, a supporting and locking mechanism for said gates, a trip-rod for said supporting and locking mechanism, a toggle connected to said trip-rod, a rock-shaft, a spring connected to and adapted to rotate said rock-shaft, an arm connecting said rock-shaft and said toggle, the scale-beam, and a link connecting said toggle and said scale-beam, whereby when the scale-beam is caused to rise by the weight the toggle is broken and the spring freed therefrom and permitted through the trip-rod to operate said holding and locking mechanism for the gates.

2. The combination, in an automatic grain-weighing scale, with the supporting and locking mechanism for the discharging-gates, of a tripping mechanism consisting, essentially, of a rock-shaft actuated by a spring, an arm on said rock-shaft, a toggle connected with said arm, and a connection from said toggle to the scale-beam, whereby the scale-beam in rising is enabled to break the toggle and set off the tripping mechanism, substantially as set forth.

3. The combination, in an automatic grain-weighing scale, of two grain-receptacles, the discharging-gates, mechanism for operating the same, a shifting chute whereby the grain is directed first into one and then the other of said grain-receptacles, and rods running from said discharging-gates to the sides of said shifting chute, whereby the gates in opening are enabled to effect the shifting of said chute, said rods being formed in two pieces, which are connected together by a sliding joint, whereby said connection is rendered loose or free, thus obviating any stiffness in the operation of the machine which would interfere with the accuracy of the weighing, substantially as set forth.

4. The combination, in an automatic grain-weighing scale, of the hopper, two reducing-gates for said hopper, two shafts for said reducing-gates, located at a central point, one of which is hollow and sleeved upon the other, and mechanism for operating said shafts, substantially as set forth.

5. The combination, in an automatic grain-weighing scale, of the hopper, reducing-gates connected to said hopper, two shafts for said reducing-gates, one of which is hollow and sleeved upon the other, said shafts being located at a central point, weighted arms rigidly connected to said shafts, weighted catches pivoted to the hangers, through which the ends of the scale-beams pass and which act as stops or holding-supports for said weighted arms, and the scale-beams which operate in connection with said weighted catches, whereby said weighted catches are moved to periodically release said weighted arms and then to support them in raised position, substantially as set forth.

6. The combination, in an automatic grain-weighing scale, of a supporting and locking mechanism for the discharging-gates, consisting of a bell-crank lever pivoted at the angle in a bearing in the upper part of the grain-receptacle, a rod running from the discharging-gate to one arm of said bell-crank lever and the other arm of said bell-crank lever being large and heavy and containing a spring-catch, and a latch, with which said catch will engage, substantially as set forth.

7. The combination, in an automatic grain-weighing scale, of the bell-crank lever J, to which the discharging-gate of the scale is connected, a spring-catch $j$ therein, a small bell-crank lever $J^2$, also therein, by which said spring-catch is operated, and a latch $J'$, with which said spring-catch engages, substantially as set forth.

8. The combination, in an automatic grain-weighing scale, of two rock-shafts located at a central point, one sleeved upon the other, reducing-gates independently mounted upon said rock-shafts, weighted arms also mounted upon said rock-shafts, a shifting chute loosely mounted upon said rock-shafts, slots in the end of said shifting chute, and pins extending from said reducing-gates out through said slots, whereby as said shifting chute is moved it will, by means of the contact between the slot therein and the corresponding pin, open the reducing-gate which has been closed and elevate the corresponding weight and weighted arm.

9. The combination, in an automatic grain-weighing scale, of two reducing-gates, two shafts therefor, weighted arms for operating said reducing-gates, a shifting chute having slots, and pins on said reducing gates, which enter said slots, whereby the movement of said shifting chute is enabled to alternately open first one and then the other of said reducing-gates as it is shifted from one position to the other, thus restoring them to position for the succeeding operations, substantially as set forth.

In witness whereof I have hereunto set my hand and seal, at Indianapolis, Indiana, this 4th day of August, A. D. 1891.

JAMES H. GUNDER. [L. S.]

Witnesses:
CHESTER BRADFORD,
J. A. WALSH.